United States Patent [19]
Agneta

[11] 3,861,640
[45] Jan. 21, 1975

[54] INTERCHANGEABLE MOLD ASSEMBLY

[75] Inventor: Nicholas J. Agneta, North Bellmore, N.Y.

[73] Assignee: Ideal Toy Corporation, Hollis, N.Y.

[22] Filed: May 21, 1973

[21] Appl. No.: 361,940

[52] U.S. Cl. ............................... 249/102, 249/160
[51] Int. Cl. ........................................... B41b 11/62
[58] Field of Search ........... 249/102, 122, 124, 125, 249/126, 154, 155, 170, 176, 167, 103, 168, 249/104, 169, 164, 165, 55; 425/DIG. 32, 425/DIG. 57

[56] References Cited
UNITED STATES PATENTS

| | | | |
|---|---|---|---|
| 705,146 | 7/1902 | Richter | 249/170 |
| 839,987 | 1/1907 | Butters | 249/103 |
| 940,208 | 11/1909 | Southerland | 249/168 |
| 945,537 | 1/1910 | Hoffmann | 249/164 X |
| 1,270,886 | 7/1918 | Siptrott | 249/168 X |
| 1,595,773 | 8/1926 | Gillinder | 249/103 X |
| 2,395,589 | 2/1946 | Silverman | 425/DIG. 57 |
| 2,451,711 | 10/1948 | Beder | 425/DIG. 57 |
| 3,061,880 | 11/1962 | Weisbach | 249/104 |

Primary Examiner—Francis S. Husar
Assistant Examiner—John S. Brown
Attorney, Agent, or Firm—Richard M. Rabkin

[57] ABSTRACT

A mold assembly for use in making molded toy objects such as figurines and the like has at least two main mold sections and a plurality of interchangeable mold elements adapted to be respectively removably mounted in at least one of the main mold sections. The two main mold sections and the interchangeable mold elements have cooperating mold cavities therein which define the toy object to be molded in the assembly. One of the main mold sections has a recessed receptacle portion in which at least one of the interchangeable mold elements can be selectively positioned. These interchangeable mold elements are each formed to define the body portion of a different figurine or toy object so that a variety of objects can be formed with the two main mold sections by simply interchanging the mold elements placed in the receptacle portion of the one main mold section.

9 Claims, 12 Drawing Figures

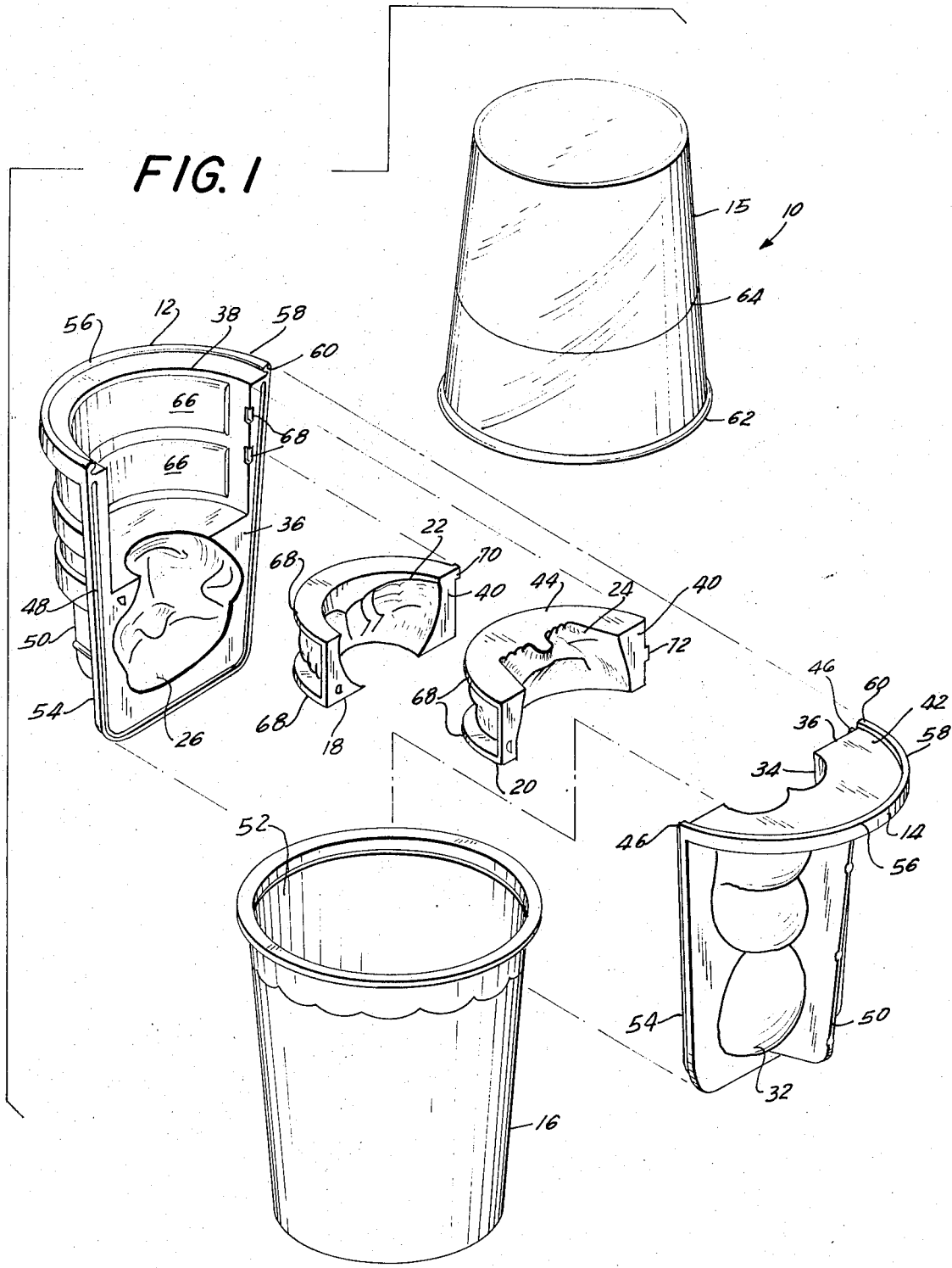

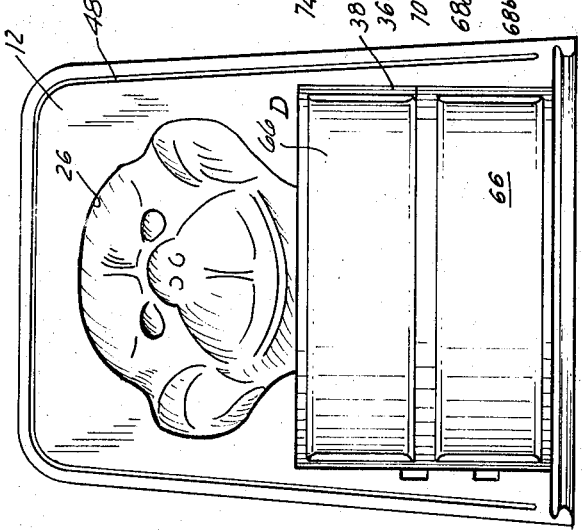
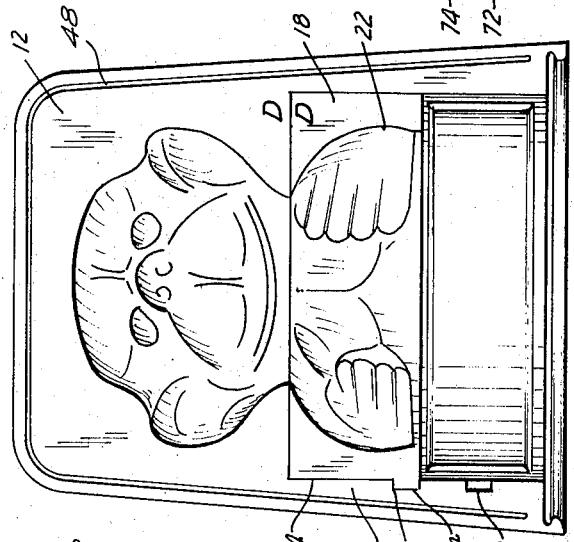
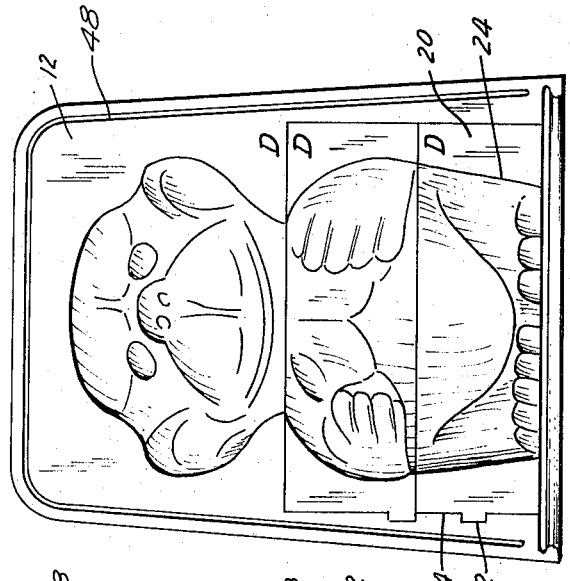
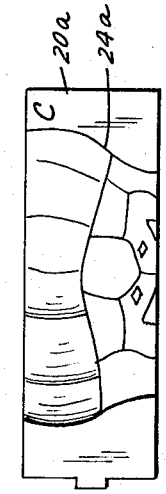
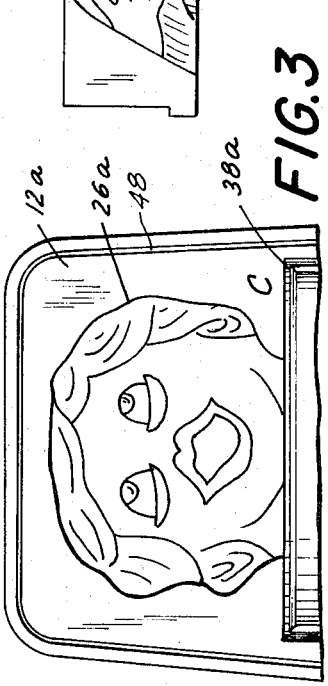

INTERCHANGEABLE MOLD ASSEMBLY

The present invention relates to a mold assembly and more particularly to a mold assembly having interchangeable parts which permit a plurality of varying objects and/or figurines can be formed.

The present invention is an improvement upon the shaken mixer mold assembly described and claimed in U.S. Pat. application Ser. No. 164,740, filed July 21, 1971; the assignee of the present application being the exclusive licensee of said patent application Ser. No. 164,740. The assembly disclosed in that application utilizes a pair of mold halves which are urged together when pushed into a holder cup. The mold halves have cavities formed therein which cooperate to define a toy figurine that is formed by inserting a mixture of water and molding powder into the molds positioned within the holder. As described in that application, only a single figurine can be formed from any two mold halves.

The present invention improves upon the structure of said prior application in that it permits a large number of toy figurines or objects to be formed from a single pair of mold sections, by the use of a plurality of interchangeable mold parts which can be selectively inserted or removed from one of the mold sections. As a results, toy figurines having a large variety of forms or combinations of forms can be provided. In accordance with another feature of the invention the various interchangeable mold elements are keyed to the mold sections so that the elements can only be placed in their proper relative configuration to form a figurine having a head, torso, and legs in proper relative positions to one another.

Accordingly, an object of the present invention is to provide a mold assembly for a shaker-mixer-mold prosess by which a large variety of toy figurines or the like can be formed.

Another object of the present invention is to provide a molding assembly in which various sections of body portions of the object being molded can be selectively varied.

Yet another object of the present invention is to provide a mold assembly which is relatively inexpensive in manufacture and durable in use and yet one which will provide a large variety of molded objects with a minimum number of mold parts.

The above, and other objects, features and advantages of the present invention, will be apparent in the following detailed description of illustrative embodiments thereof which are to be read in connection with the accompanying drawings, wherein:

FIG. 1 is an exploded perspective view showing a molding assembly constructed in accordance with an embodiment of the present invention;

FIG. 2A-2C are front elevational views of a mold half showing the placement therein of a pair of interchangeable mold elements;

FIG. 3 is a partial elevational view of a mold half, similar to that shown in FIG. 2A, but having a different toy figurine configuration in its mold cavity;

FIGS. 4A and 4B are front elevational views of mold elements adapted to be used to form a figurine with the mold half of FIG. 3;

Figure 6:
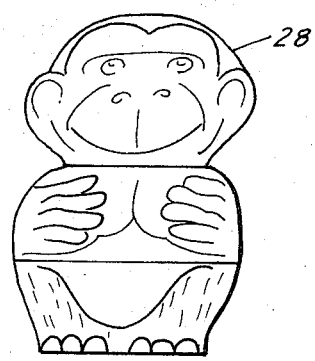
FIGS. 6-9 are front elevational views of objects molded in the molding device of FIG. 1, using different interchangeable mold elements therein, after the objects have dried and shrunk to final form.

Referring now to the drawing in detail, and initially to FIG. 1 thereof, it is seen that a shaker-molding device constructed in accordance with one embodiment of the present invention includes a pair of relatively thin plastic mold halves 12, 14, a transparent plastic measuring cup 15 and a mold holder 16. Mold half 12 is constructed, as described more fully hereinafter, to removably receive and support a pair of mold elements 18, 20, which have mold cavity sections 22, 24 formed respectively therein for cooperation with a mold cavity section 26 in mold half 12 to form the front portion of a composite mold cavity in mold half 12 which is used to form the front of an object, or toy figurine 28, such as shown in FIG. 6. Mold half 14 includes an opposite concave portion 32 which forms a mold cavity 34 for forming the back portion of the figurine.

Each of the mold halves, 12, 14 includes a flat face portion 36 surrounding the mold cavities 26, 34. Flat section 36 of mold half 12 also extends outwardly of a recess or cavity portion 38 which defines a receptable that receives the mold elements 18, 20. The latter elements also include flat face portions 40 outwardly of their cavities 22, 24, which flat face portions lie in substantially the same plane as flat face portion 36 of mold 12 when the mold elements are seated in receptacle 38. As seen in FIG. 1, the flat faces 36 of the mold halves surround three sides of each of their associated mold cavities with the fourth side 42 of mold half 14 and side 44 of mold element 20 being open to permit access to the interior of the mold when the mold havles 12, 14 are placed in juxtaposition with respect to each other to define the completed mold.

Mold half 14 includes a peripheral rib or tongue 46 about three sides of the flat face 36, in a generally U-shaped configuration, which tongue is received in a complementary groove 48 formed about the periphery of the flat face 36 of mold half 12 when the mold halves are placed in juxtaposition with the faces 36 abutting each other. This groove locates the two mold halves with respect to one another and aligns the back and front cavities of the mold so that they form a complete chamber corresponding to the figurine to be made.

Each of the mold halves 12, 14 includes a wedge-shaped rib 50 extending outwardly from the rear side thereof in a plane perpendicular to the plane of the flat faces 36. These wedge-shaped ribs are complementary to and cooperate with the inner surface 52 of the mold holder 16, the latter being of a generally frustroconical shape and having an interior cavity defined by the wall 52 which receives the mold halves. As a result of this construction, the interaction between the ribs 50 and the wall 52 of the mold holder 16 urges the mold halves together with the flat faces 36 of the mold halves (and 40 of the mold elements) tightly engaging each other. The upright frustroconical edge portions 54 of the mold halves 12, 14 are also complementary to each other and to the wall 52 of mold holder 16 and thus serve to position the mold halves properly inside the mold holder. Preferably, mold halves 12, 14 are formed of a relatively flexible material such as polyethylene or the like, while the mold holder 16 is formed of a relatively rigid plastic material such as polystyrene.

The upper edges 56 of mold sections 12, 14 are generally circular in plan and are provided with upstanding semi-circular ribs 58. Each rib has an inwardly opening slot 60 which receives a flange 62 at the mouth of the measuring cup 15 to lock and seal the edge of the measuring cup to the mold halves when the mold halves are in juxtaposition with the holder 16.

Measuring cup 15 is formed of a transparent material and preferably may be formed of transparent plastic, glass, or the like, and it is provided with an indicator line 64 to which the measuring cup is filled with water in the performance of the molding operation. The volume of the liquid contained in the measureing cup 15 when filled to the indicator line 64 can be the volume which, when mixed with a predetermined amount of molding powder, will fill the mold cavity defined by the mold halves 12, 14 and mold elements 18, 20.

Figure 5:
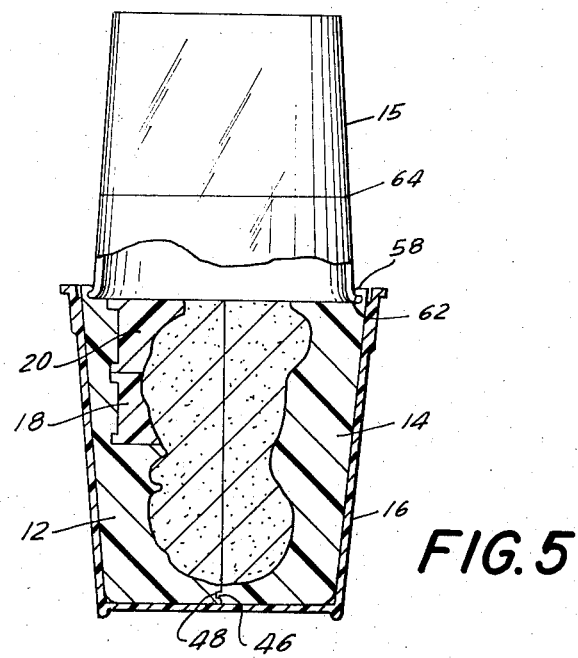
FIG. 5 is a partial sectional view of the molding device shown in FIG. 1 with the sections thereof in assembled relation.

Although a variety of types of molding materials can be used in the molding process performed with the assembly of the present invention, the preferred material is that described in the above-mentioned patent application and consists of the following:

10% Potassium Alginate
12% $CaSO_4$ $H_2O$
¾% Anhydrus Tetrasodium Pyrophosphate
74¼% Coarse Ground Diatomaceous Earth
1% Pigment In performing the molding operation with the assembly of the present invention a suitable amount of molding powder mixture is added to the water in measuring cup 15 and mold halves 12, 14 are assembled over the measuring cup with the groove 60 thereof engaged with the rib or flange 62 of the measuring cup. In this position the groove 48 and tongue 46 of the respective mold halves are in mating engagement and locate the mold halves and the elements 18, 20 with respect to one another. Mold holder 16 is then placed over the mold halves to maintain the latter in juxtaposition with measuring cup 15 locked to the mold halves as seen in FIG. 5. The contents of the assembly are then shaken 15 to 20 times to cause thorough mixing of the molding powder and the water. The assembly is then set in an inverted configuration, as seen in FIG. 5, and the contents of the measuring cup are permitted to flow into the mold cavity between the mold halves 12, 14 to set or gel therein.

As removed from the mold halves, object 28 is of jeltion, after approximately 5 minutes the assembly is taken apart. The measuring cup 15 is removed and the mold holder is inverted. The edge of the mold holder is then tapped on the edge of a table or the like (not shown) to cause the mold halves to be released from the mold holder. The mold halves are withdrawn in directions normal to the flat face portions 36 thereof to release the molded object 28 from therebetween.

As removed from the mold halves, object 28 is of jelly-like consistency and as it dries it shrinks but retains its shape and appearance so that eventually, after a period of a few days of drying at room temperature, it becomes a dried object having a volume of approximately one-fourth of the original volume. The dry object is rigid and dry to the touch, unlike the original jelly-like object as removed from the mold halves.

An important feature of the present invention is the provision of mold element 18, 20, which permit the user to modify the object which is being molded with the assembly 10. That is, a plurality of different mold elements 18, 20 are provided so that they can be interchanged in order to vary the torso configuration of object 28.

Figure 8:
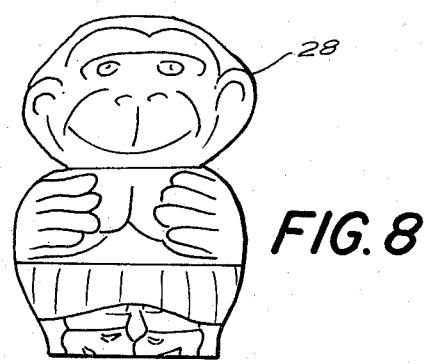

For example, as seen in FIGS. 2A-2C, mold half 12 can be provided such that the mold cavity 26 therein has the configuration of the head of a monkey, with the cavity portions 22, 24 of mold elements 18, 20 respectively defining the middle torso portion of the monkey and the bottom torso and leg portions of the monkey. In addition to the mold elements 22, 24, modified middle body torso mold elements 18 and leg mold elements 20 can be provided such as for example are illustrated in FIGS. 4A and 4B. As seen therein additional mold elements 18a, 20a, are provided having mold cavities 22a, 24a which define respectively the middle torso portion of a caricature of a woman and the bottom torso and leg portions of the woman. These mold sections may be interchanged for mold elements 18, 20 of FIGS. 2B, 2C, as desired, so as to modify the configuration of the object produced by the mold assembly. Thus, for example, a figurine such as shown in FIG. 8 can be provided by substituting the mold element 20a for the mold element 20 in FIG. 2C, to provide a figurine having the head and middle portions of a monkey and the bottom of a caricature of a woman. Alternatively, the middle body portion 18 of the mold for the monkey can be removed and the mold element 18a shown in FIG. 4A substituted therefore in cooperation with the mold element 20 so as to provide a figurine having the head of a monkey, the middle body portion of a woman and the bottom body portion and legs of a monkey. Another alternative is that both of the mold elements 18a and 20a be substituted for the mold elements 18, 20 so as to provide a figurine having the head of a monkey and the middle and lower body portions of a caricature of a woman. Accordingly, it is seen that a greater flexibility and an increase in the number of possible figurines which can be formed by the mold assembly is provided. Moreover, as will be apparent, additional mold elements 18, 20 can be provided with their mold cavities 22, 24 being formed in other configurations so as to further increase the number of variations of figurines which can be produced with the mold half 12.

This variety of figurines produced by the single mold half 12 is achieved by forming the mold half 12, as described above, with an enlarged cavity 38 which defines a receptacle for receiving mold elements 18, 20. As seen in FIG. 1, receptacle 38 is provided with a pair of integral generally rectangular projections 66 which are curved about the rear of the mold half and which provides guiding support for the respective mold elements 18, 20. The latter, as also seen most clearly in FIG. 1, are provided with upper and lower spaced laterally extending flange members 68, of generally semi-circular configuration in plan, which are adapted to surround the respective projections 66. Mold elements 18, 20 are of substantially equal width and the sum of their widths or heights is equal to the height of the receptacle 38, so that when they are placed in the receptacle they form, with cavity 26, the completed front portion of the mold for the figurine.

Since it is contemplated, in accordance with the present invention, that a plurality of various mold elements 18, 20 be provided having mold cavities 22, 24 respectively of different configurations in order to provide a variety of possible combinations of figurine configurations, mold half 12 and the respective mold elements are provided with cooperating keying members which insure that the mold elements 18, 20 will be placed in their proper relative positions in receptacle 38. That is, the keying members insure that the middle torso element 18 are placed directly below the cavity 26 of the mold half 12 and that the lower torso and leg sections 20 are placed adjacent the bottom of the mold, i.e., adjacent the rim 56. This is accomplished by the provision of a pair of recesses 68 in mold half 12 and a pair of cooperating projections 70, 72 on the respective mold elements 18, 20.

As seen most clearly in FIGS. 1 and 2, mold section 18 has projection 70 formed thereon along one side 74 thereof. Projection 70 is formed at the lower end of the keying side 74 for cooperation with a recess 68a located to be complementary to projection 70. On the other hand, the mold element 20 has its keying projection 72 formed along its keying edge 74 at approximately the middle of that edge for cooperation with the recess 68b in mold half 12. Thus, although various mold elements 18, 20 have substantially the same configuration or relative size, they cannot be placed in the wrong relative positions within cavity 38.

More specifically, it is seen that is a mold element 20 were placed in the location within receptacle 38 at which the middle mold element 18 should be placed, the projection 72 will engage the side face 36 of the mold half 12, thereby preventing the mold element from being properly seated within the receptacle. On the other hand, when the mold element is placed in its proper location, adjacent the lower edge of the mold half 12, then the projection 72 thereof will enter the recess 68b associated therewith to permit the mold element to be properly seated in mold half 12. Thus, in accordance with the present invention, when a plurality of mold elements 18, 20 are provided with different mold cavity configurations, all of the mold elements 18 forming middle torso portions of figurines will have the projections 70 formed at the lower edge of the keying side 74 thereof while, on the other hand, all of the mold elements 20, corresponding to the lower torso portion of the figurines, will have their keying projection 72 formed along an intermediate portion of their keying side 74.

Figure 7:
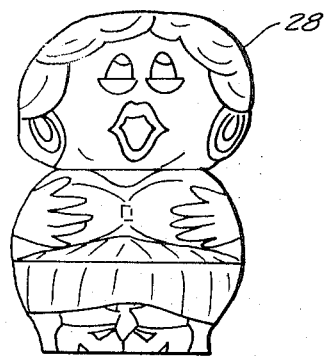
Figure 9:
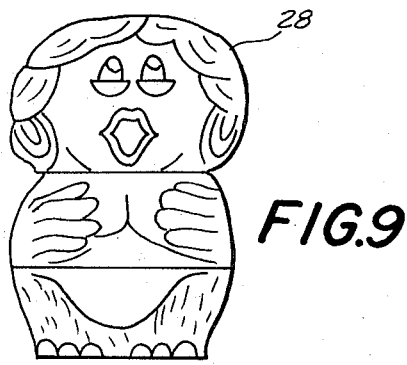

In addition, it is noted that the provision of the keying elements 70, 72 along only one edge of the respective mold elements insures that the mold elements will be placed in their proper upright configuration within the mold half 12 and thus in proper relation to head cavity 26. In one embodiment of the invention it is comtemplated that more than one half 12 can be provided. Thus, for example, as seen in FIG. 3, an additional mold half 12a may be provided along with the other mold elements described above. This mold element has a mold cavity 26a which conforms in configuration to the facial features of another figurine, for example, the caricature of a woman. Mold half 12a has a receptacle 38a, corresponding to the receptacle 38 described above for mold element 12, which is adapted to receive the mold elements 18a, 20a forming the remaining portions of the body of the woman. With this additional mold element, it is possible to use the mold elements 18, 20 forming portions of the monkey body, to form figurines such as shown in FIG. 9, wherein the figurine has the head of a caricature of a woman and the body and lower portions of a monkey. The entire assembly of mold elements 12a, 18a, and 20a will form a caricature of a woman such as shown in FIG. 7.

According to another aspect of the invention, each of the mold halves 12, 12a, etc. and each of the mold elements 18, 20 are coded to enable the user to readily determine the figurine which will be formed thereby. Thus, for example, as shown in FIGS. 2-4, the mold half 12 having a cavity 26 for forming the monkey head is coded with the letter D, as are the mold elements 18, 20 which form the torso portions of the monkey. On the other hand, mold half 12a for forming the caricature of a woman is coded with the letter C (which may simply be molded integrally with the mold half). The mold elements 18a and 20a are thus also coded with the letter C since they form the torso portions of the woman. Of course, if other mold halves and mold elements are provided to form other figurines, they will be coded with other letters, numbers or the like. This coding arrangement permits the user to readily determine what figurine each of the elements and mold halves constitute and will, with the keying members on the mold elements, facilitate selection of the mold parts required to form a particular type of figurine. It is noted that mold half 14 is not coded since only one of these need be provided for use as a common figurine back mold part for use in conjunction with each of the mold halves 12.

Accordingly, it is seen that a relatively simple and inexpensive molding assembly is provided which can, with a minimum of parts, form a large variety of figurines of various configurations. The assembly is constructed so that the elements 18, 20 cannot be inadvertently placed in inverted positions or in the wrong relative positions in mold halves 12. Moreover, although the invention has been described as using two mold elements in mold halves 12, it is contemplated that one or even more than two such interchangeable elements can be mounted in the mold half by properly dimensioning the latter.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. A mold assembly for use in making molded toy figurines from a settable liquid mold material, said assembly comprising a pair of mold halves and a plurality of interchangeable mold elements adapted to be respectively removably mounted in one of said mold halves, said mold halves and said interchangeable mold elements having cooperating mold cavities of distinct configuration defining a toy figurine mold when said mold halves are placed in juxtaposition with said cavities facing each other; the cavity of said one mold half including an integrally formed first cavity portion corresponding to a portion of the configuration of the figurine to be formed and a second cavity portion for removably and interchangeably receiving at least one of said mold elements therein, whereby a portion of the configuration of the side of the figurine formed by said one mold half may be varied by selectively interchanging the mold elements received in said second cavity portion; said second cavity portion being dimensioned to receive at least two of said interchangeable mold elements and said interchangeable mold elements defining at least two groups of mold elements, corresponding respectively to at least two body portions of the figurines to be formed, with each mold cavity in said elements having a different configuration for its respective body portion; each of said mold halves including a flat face extending outwardly from the sides and one end of their respective cavities, and an end face plate extending radially outwardly from the other end of the mold cavity, perpendicularly to said flat face, said mold halves defining an opening into their mold cavitites through said end face plate when said mold halves are placed in juxtaposition to each other, whereby said settable liquid mold material can be poured into the mold cavity to form a toy figurine.

2. The mold assembly as defined in claim 1 wherein the mold cavities and said interchangeable mold elements are configured to define different body portions of different figurines.

3. The mold assembly as defined in claim 1 wherein said one mold half and said mold elements have cooperating key members for locating said interchangeable mold elements in their proper configuration in said receptacle.

4. The mold assembly as defined in claim 1 wherein said one mold half and the mold elements in said tow respective groups of mold elements include cooperating key members for positioning the mold elements in their proper position relative to one another and to said integrally formed first cavity in said one mold half, and with respect to the mold cavity in the other said mold halves.

5. The mold assembly as defined in claim 4 wherein said cooperating key members comprise recesses formed in said one mold half and cooperating projections formed on said mold elements.

6. The mold assembly as defined in claim 5 wherein said mold elements have substantially identical configurations including similar keying edge portions on their peripheries, said keying projections being formed on said keying edge portions and extend laterally thereof, with the projections on said mold elements in one of said groups being in a different location from the projections of the mold elements in the other of said groups whereby the elements of each group may only be placed in a single location within said second cavity portion in association with their respective cooperating recesses.

7. The mold assembly as defined in claim 1 including a frustroconically shaped mold holder for receiving said mold halves in juxtaposition to each other, said mold halves having outwardly extending wedge-shaped ribs on each mold half engaging the interior wall surface of said frustronconically shaped holder to hold the mold halves together with the flat faces thereof in engagement.

8. The mold assembly as defined in claim 7 wherein the outer edges of the flat faces of the mold halves are wedgeshaped and engage the inner wall of said holder, said outer edges having cooperating means for aligning the mold halves.

9. The mold assembly as defined in claim 7 including a cup having an open mouth and cooperating means on said cup adjacent said open mouth and on said mold halves adjacent the periphery of said end face plates for sealing said cup and mold halves together to prevent inadvertent discharge of the contents of the mold when shaken.

* * * * *